United States Patent [19]

Ito et al.

[11] Patent Number: 5,504,533
[45] Date of Patent: Apr. 2, 1996

[54] IMAGE PICKUP APPARATUS FOR SYNTHESIZING IMAGE SIGNALS AND IMAGE SIGNAL PROCESSING SYSTEM

[75] Inventors: Hiroya Ito; Yoshihito Higashitsutsumi, both of Gifu, Japan

[73] Assignee: Sanyo Electric Co., Ltd., Osaka, Japan

[21] Appl. No.: 352,434

[22] Filed: Dec. 9, 1994

Related U.S. Application Data

[63] Continuation of Ser. No. 23,735, Feb. 23, 1993, abandoned, which is a continuation of Ser. No. 720,326, Jun. 25, 1991, abandoned.

[30] Foreign Application Priority Data

Jun. 26, 1990 [JP] Japan ................ 2-167634
Aug. 31, 1990 [JP] Japan ................ 2-231680

[51] Int. Cl.$^6$ ........................ H04N 5/262; H04N 5/272
[52] U.S. Cl. ........................ 348/511; 348/588; 348/522
[58] Field of Search ........................ 348/563, 564, 348/565, 584, 588, 511, 522, 516; H04N 5/262, 5/272

[56] References Cited

U.S. PATENT DOCUMENTS

| | | | |
|---|---|---|---|
| 3,368,034 | 4/1964 | Dischert et al. | 358/149 |
| 3,487,162 | 12/1969 | Gordon et al. . | |
| 3,549,793 | 12/1970 | Ross | 358/22 |
| 3,898,377 | 8/1975 | Fairbairn et al. | 358/148 |
| 4,245,252 | 1/1981 | Nagumo | 358/213.11 |
| 4,729,027 | 3/1988 | Hakamada et al. | 348/564 |
| 4,803,553 | 2/1989 | Schrock et al. | 358/149 |
| 4,860,101 | 8/1989 | Pshtissky et al. . | |
| 4,914,509 | 4/1990 | Idei | 358/183 |
| 4,999,709 | 3/1991 | Yamazaki et al. | 358/22 |
| 5,051,817 | 9/1991 | Takano | 358/22 |
| 5,187,582 | 2/1993 | Higashitsumi | 358/183 |

FOREIGN PATENT DOCUMENTS

84109319.8 8/1984 European Pat. Off. .

OTHER PUBLICATIONS

"Televison Engineering (CCIR Systems–B Standards), Arvind M. Dhaked, 1980, Tata McGraw–Hill Publishing Company Limited", pp. 92–93.

Primary Examiner—James J. Groody
Assistant Examiner—Glenton B. Burgess
Attorney, Agent, or Firm—Armstrong, Westerman, Hattori, McLeland & Naughton

[57] ABSTRACT

A system for synthesizing an image signal for a main scene with a plurality of image signals from image pickup devices for taking inset scenes displays the inset scenes over the main scene on a single screen. The system forms a signal representative of a drive timing for a TV inset scene camera, from a synchronizing signal in an image signal for one main scene. The TV inset scene camera is actuated by the drive timing to provide an inset scene image signal synchronizing with the synchronizing signal of the main scene. The drive timing serves to switch the main scene image signal and the inset scene image signal from one to another to synthesize another image signal. If a plurality of image pickup devices are provided remotely from each other, these image pickup devices are connected with each other through a communication line. The synchronizing signal separated from the main scene image signal is supplied to each inset scene image pickup device through the communication line while the image signal from the inset scene image pickup device without a synchronizing signal is fed to the main scene image pickup device through a common communication line.

10 Claims, 7 Drawing Sheets

IMAGE PICKUP APPARATUS FOR SYNTHESIZING IMAGE SIGNALS AND IMAGE SIGNAL PROCESSING SYSTEM

This application is a continuation of application Ser. No. 08/023,735 filed Feb. 23, 1993, now abandoned, which is a continuation of application Ser. No. 07/720,326 filed Jun. 25, 1991, now abandoned.

BACKGROUND OF THE INVENTION

1. Field of the Invention

The present invention relates to an image pickup apparatus for superimposing a plurality of image signals one on another to display a plurality of reproduced scenes on one screen, and an image signal processing system.

2. Description of the Related Art

Figure 8:
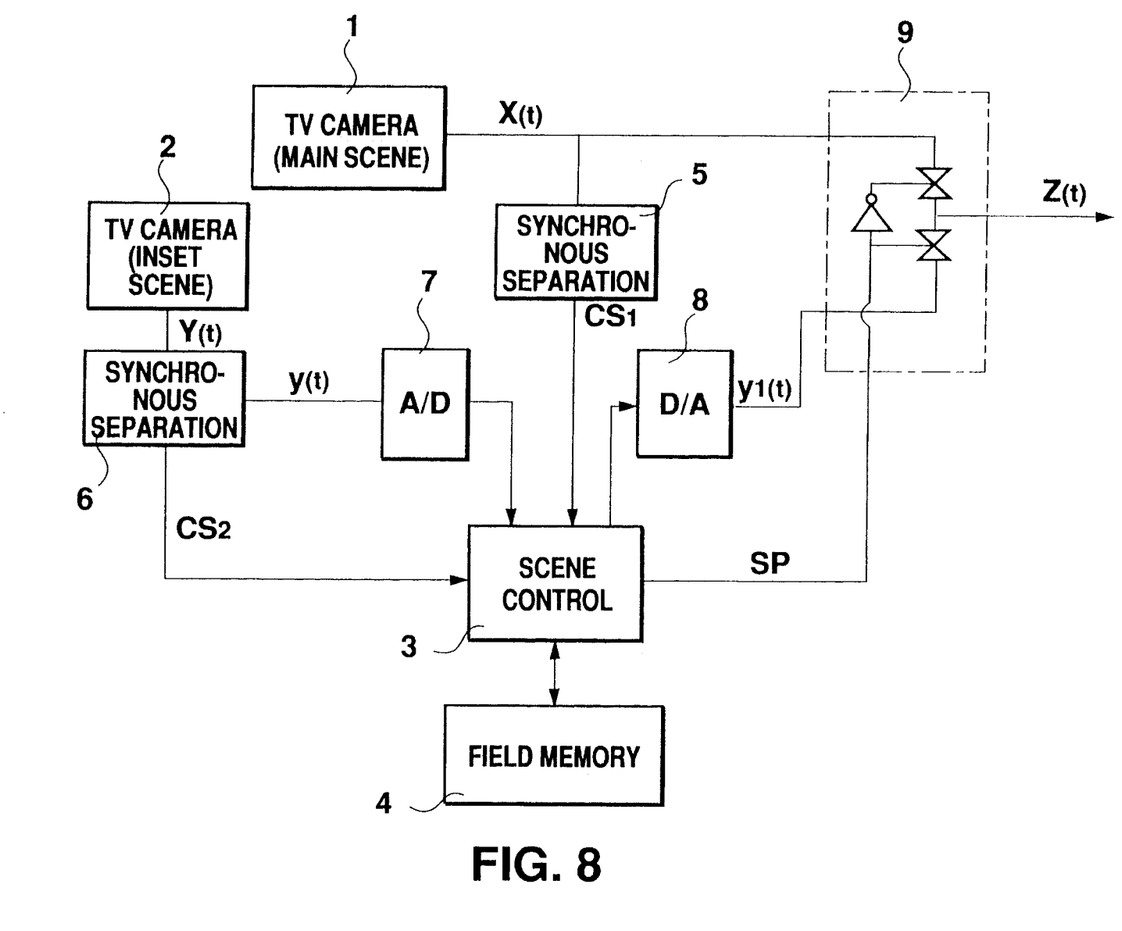
FIG. 8 is a circuit diagram of still another image signal processing circuit.

FIG. 8 is a block diagram of the schematic arrangement of an image signal processing circuit for superimposing an image signal providing an inset scene on another image signal providing a main scene, which circuit has been used by the inventors.

The circuit comprises a TV camera 1 for taking an image signal $X_{(t)}$ providing a main scene, the camera 1 being adapted to be actuated by a synchronization signal which is prepared in the camera itself. The image signal $X_{(t)}$ consists of such a synchronizing signal and an image component superimposed on the synchronizing signal. The circuit also comprises another TV camera 2 for taking an image signal $Y_{(t)}$ providing an inset scene. This inset scene camera is similarly actuated by a synchronizing signal which is generated in the inset scene camera itself. The image signal $Y_{(t)}$ also includes the synchronizing signal.

The image signals $X_{(t)}$ and $Y_{(t)}$ are respectively outputted from the TV cameras 1 and 2 which are independently actuated at different timings. Since these image signals are thus different in scan timing from each other, they cannot be superimposed one on another as they are. In order to overcome such a problem, the image signal processing circuit further comprises a scene control circuit 3 which causes the image signal $Y_{(t)}$ to be once stored in a field memory 4. The image signal $Y_{(t)}$ is then read out of the field memory 4 in accordance with the synchronizing signal in the image signal $X_{(t)}$. As a result, the scan timing of the image signal $Y_{(t)}$ will be consistent with that of the image signal $X_{(t)}$. The synchronizing signal CS1 of the image signal $X_{(t)}$ is separated From the image signal $X_{(t)}$ at a synchronizing separation circuit 5 and then supplied to the scene control circuit 3.

On the other hand, the image signal $Y_{(t)}$ is divided into a synchronizing signal component CS2 and an image signal component $y_{(t)}$ at a synchronizing separation circuit 6. The image signal component $y_{(t)}$ is supplied to the scene control circuit 3 through an A/D converter 7 while the synchronizing signal CS2 is provided directly to the scene control circuit 3.

A digital image component is written in the field memory 4 in accordance (or in synchronism) with the synchronizing signal CS1. A digital image signal is read out from the field memory 4 in accordance with the synchronizing signal CS1 and then converted into an analog image signal $y_{1(t)}$ by a D/A converter 8, which signal is in turn fed to a synthesizing circuit 9.

The image signal $y_{1(t)}$ is one for forming an inset scene smaller than a main scene defined by the image signal $X_{(t)}$ and includes horizontal and vertical image signal components which are reduced by thinning or synthesizing any suitable number of bits from tile data of the image signal $y_{1(t)}$. The scene control circuit 3 generates a selection pulse SP in synchronism with the effective imaging period in the image signal $y_{1(t)}$, the selection pulse ST being then supplied to the synthesizing circuit 9. The synthesizing circuit 9 replaces the main scene image signal $X_{(t)}$ with the image signal component $y_{1(t)}$ in response to the selection pulse ST. In other words, the synthesizing circuit 9 is actuated by the selection pulse SP such that it will selectively output the image signal $X_{(t)}$ from the TV camera 1 or the image signal $y_{1(t)}$ from the D/A converter 8. In such a case, the image signal X is steadily selected, but the image signal $y_{1(t)}$ is selected only within its effective imaging period. In such a manner, there is provided an image signal $Z_{(t)}$ for displaying the inset scene of tile image signal $y_{1(t)}$ on a part of the main scene.

The position of the main scene at which the inset scene is displayed is determined by a timing at which the image signal $y_{1(t)}$ is outputted. It can be set by setting a delay on the output of the image signal $y_{1(t)}$ relative to the horizontal and vertical scan timings of the synchronizing signal $CS_1$. For example, if the signal $y_{1(t)}$ is outputted with a delay relative to the horizontal scan timing of the synchronizing signal $CS_1$, the position of the inset scene is moved on the main scene rightwardly. On the contrary, if another delay is provided relative to the vertical scan timing, the inset scene is moved on the main scene downwardly.

In such an arrangement, a part of the main scene can be replaced by an inset scene, the main and inset scenes being simultaneously displayed on one monitor screen.

However, such an arrangement is required to once store the image signal $X_{(t)}$ in the field memory 4. This additionally requires the A/D converter 7 for converting the image signal $y_{(t)}$ into a digital value and the D/A converter 8 for reconverting the digital value into tile image signal $y_{1(t)}$. In general, the A/D and D/A converters 7, 8 used to process the image signals require special circuits for meeting their highspeed requirements, leading to increase of cost.

These converters also contributes to increase of the entire scale of the system. Thus, the A/D and D/A converters cannot be easily installed in any small-sized TV camera. This requires a separate unit for processing the image signals, Further leading to increase of manufacturing cost.

SUMMARY OF THE INVENTION

The present invention provides an image pickup apparatus for synthesizing a first image signal into a second image signal, said apparatus comprising a solid state image pickup element including a plurality of light receiving elements arranged into a matrix, said image pickup element being adapted to generate a charge of information corresponding to an image pattern received by said light receiving elements; a drive circuit for transferring and outputting the charge of information from said solid state image pickup element to provide the second image signal; a detecting circuit for detecting the horizontal and vertical synchronizing signals in said first image signal; a timing control circuit for determining a timing at which said drive circuit is to be driven, based on the horizontal and vertical synchronizing signals from said detecting circuit; and a synthesizing circuit for selecting said first and second image signals to synthesize them in synchronism with the actuation of said drive circuit.

The present invention also provides an image signal synthesizing system for synthesizing a first image signal with a second image signal utilizing a communication line, said system comprising a synchronous separation circuit for separating a synchronizing signal from the first image signal; a communication line for transmitting an image signal from an external unit; delivery means for delivering the synchronizing signal from said synchronizing separating circuit to said communication line; and a synthesizing circuit for receiving the image signal from said communication line and the second image signal and for selecting and synthesizing these image signals at a timing based on said synchronizing signal.

The present invention further provides an image pickup apparatus for outputting the second image signal to be synthesized with the first image signal utilizing the communication line, said apparatus comprising a synchronizing separating circuit connected to said communication line and for separating a synchronizing signal supplied externally through said communication line; and a TV camera actuated by the synchronizing signal from said synchronous separation circuit and operative to provide an image signal synchronizing with said synchronizing signal and to output said image signal into said communication line.

The present invention further provides an image signal synthesizing system for synthesizing first and second image signal together, said system comprising a first block including a synchronizing separation circuit for separating a synchronizing signal from said first image signal, a communication line for transmitting an image signal from an external unit, delivery means for delivering the synchronizing signal from said synchronizing separation circuit to said communication line and a synthesizing circuit for receiving the image signal transmitted from said communication line and said second image signal and for selecting and synthesizing said image signals at a timing determined by said synchronizing signal; and a second block including a synchronizing separating circuit connected with said communication line and for separating a synchronizing signal and a TV camera actuated by this synchronizing signal to output the second image signal to said communication line.

In accordance with the present invention, no synchronization of Image signals at the signal processing stage is required since an inset scene image signal is previously given in synchronization with a main scene image signal. This can omit any circuit for temporally storing tile image signals. There is thus provided an extremely simplified circuit for displaying both the main and inset scenes simultaneously on a display screen.

In accordance with the present invention, furthermore, the processing of image signals provided by the solid state image pickup device can be easily made since the image pickup device itself has a function for superimposing the image signals together. For example, this enables an image from a monitor camera as in a door phone to be displayed on the screen of a conventional TV receiver. Thus, an inexpensive monitoring system having a simplified structure can be provided.

In accordance with the present invention, an extremely simple circuit can realize a so-called picture-in-picture system which displays a plurality of images on a screen utilizing a communication line.

DETAILED DESCRIPTION OF THE PREFERRED EMBODIMENTS

First Embodiment

Figure 1:
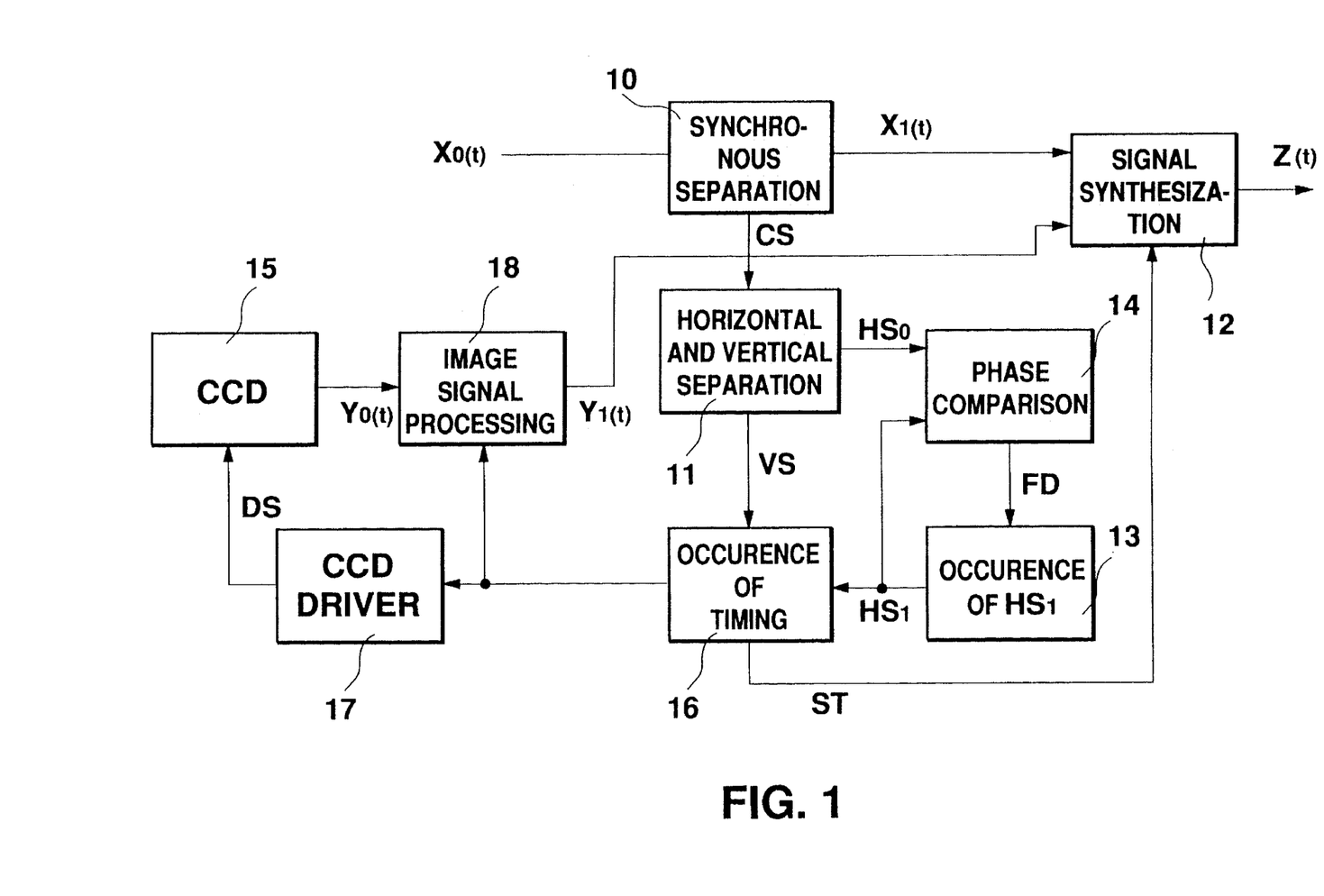
FIG. 1 is a block diagram of a solid state image pickup apparatus constructed in accordance with the present invention.

Referring first to FIG. 1, there is shown the first embodiment of a solid state image pickup apparatus constructed in accordance with the present invention.

An image signal $X_{0(t)}$ for forming a main scene is provided by a TV camera (not shown) which is operated by a user at its independent timing. The image signal $X_{0(t)}$ consists of an image signal component and a synchronizing signal component.

A synchronizing signal separating circuit 10 is provided to separate the synchronizing signal CS from the image signal $X_{0(t)}$, the synchronizing signal so separated being then supplied to a horizontal and vertical separation circuit 11. The synchronizing signal separating circuit 10 also provides an image signal $X_{1(t)}$ including a synchronizing signal to a signal synthesizing circuit 12. The horizontal and vertical separation circuit 11 divides the synchronizing signal CS from the synchronizing signal separating circuit 10 into a horizontal synchronizing signal $HS_0$ and a vertical synchronizing signal VS. The horizontal synchronizing signal $HS_0$ is fed to a phase comparing circuit 14 together with a horizontal synchronizing signal $HS_1$ from a horizontal synchronizing signal generating circuit 13. The output FD of the phase comparing circuit 14 is provided to the horizontal synchronizing signal generating circuit 13. As a source, the horizontal synchronizing signal generating circuit 13 includes, for example, a VCO (Voltage Controlled Oscillator) having its oscillation frequency which is controlled in response to the comparator output FD such that the horizontal synchronizing signal $HS_1$ is synchronized with the horizontal synchronizing signal $HS_0$ externally provided. Consequently, the horizontal synchronizing signal generating circuit 13 defines a phase locked loop with the phase comparator circuit 14.

On the other hand, an image signal $Y_{0(t)}$ for forming an inset scene is provided from a CCD 15 which is actuated by a drive clock DS from a CCD driver 17 which is in turn operated according to a drive timing DT from a timing generating circuit 16. Thus, the CCD 15 supplies an image signal processing circuit 18 with the image signal $Y_{0(t)}$ in synchronization with the drive timing DT. The image signal processing circuit 18 Forms a new image signal $Y_{1(t)}$ by subjecting the image signal $Y_{0(t)}$ to various processing steps such as sample hold, gamma correction and others, the new image signal $Y_{1(t)}$ being then supplied to a signal synthesizing circuit 12.

The CCD 15, which is used to provide the image signal $Y_{0(t)}$ for displaying a smaller or inset scene, may generally be one having a reduced number of pixels. Time required to output signals for all the pixels through the CCD driver 17 is relatively short in comparison with the signal $X_{0(t)}$.

Figure 4A:
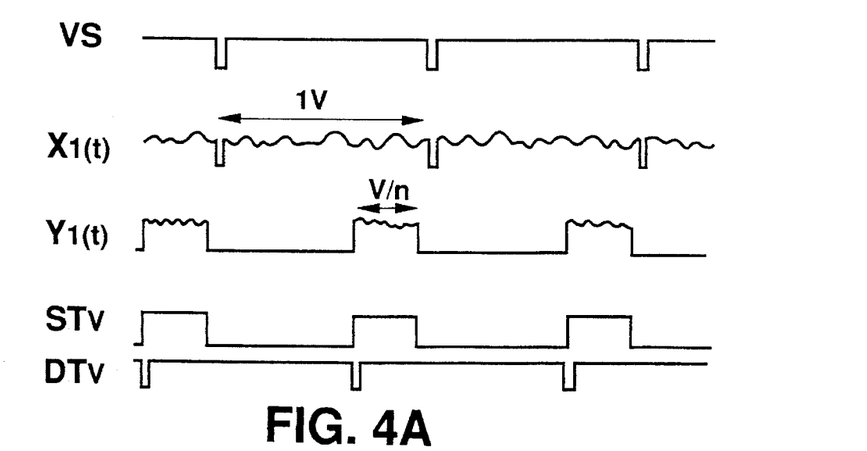
FIGS. 4A and 4B are a timing diagram of the operation of the system.
Figure 4B:
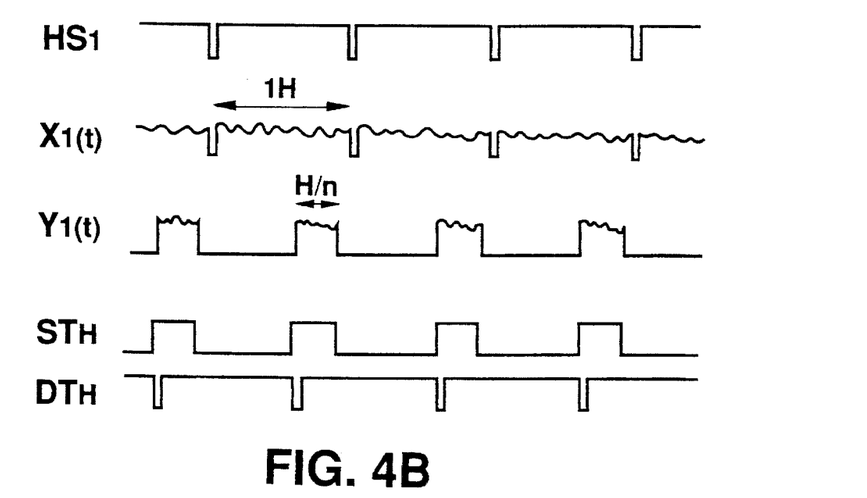

The timing generating circuit 16 operates in accordance with the horizontal and vertical synchronizing signals $HS_1$, VS so as to generate horizontal and vertical scan drive timings $DT_H$, $DT_V$ synchronized with the respective synchronizing signals $HS_1$, VS (see FIG. 4B). In other words, the timing generating circuit 16 is adapted to delay the horizontal and vertical synchronizing signals $HS_1$, VS by any appropriate time period so that the position of the inset scene is determined on the screen. For example, the circuit 16 may include a counter and a decoder, as shown in FIG. 2.

Figure 2:
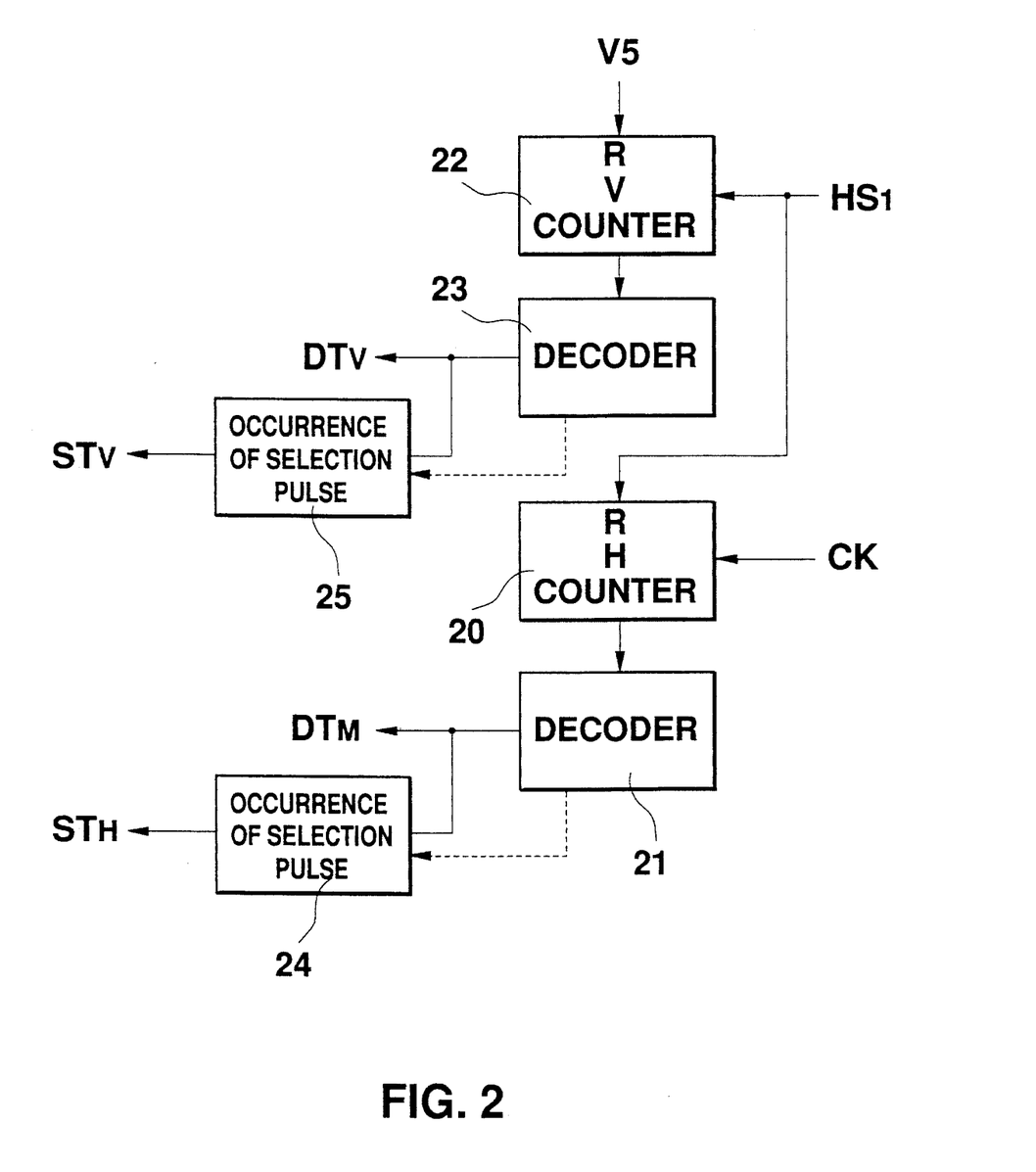
FIG. 2 is a block diagram of a timing generator.

Referring to FIG. 2, a horizontal counter 20 is reset by the horizontal synchronizing signal $HS_1$ and started by a basic clock CK from the source of oscillation in the horizontal synchronizing signal generator 13, with the output of the counter 20 being inputted into a decoder 21. The decoder 21 decodes the output of the horizontal counter 20 into a horizontal scan drive timing $DT_H$. More particularly, when the count of the counter 20 reaches a predetermined value, the decoder 21 outputs pulses corresponding to the number of basic clocks CK. Thus, the count of the counter 20 at which the decoder 21 outputs a drive timing $DT_H$ is set to be smaller than the number of basic clocks CK for one horizontal period. Therefore, the drive timing $DT_H$ will be set such that it is delayed from the horizontal synchronizing signal $HS_1$ by a period integer times that of the basic clocks CK. The output timing of the image signal $Y_{1(t)}$ will be set such that it is delayed by a predetermined period from the output timing of the horizontal synchronizing signal $HS_1$ or the horizontal scan of the image signal $X_{1(t)}$.

The vertical counter 22 is reset by the vertical synchronizing signal VS and initiated by the horizontal synchronizing signal $HS_1$, with the output of the counter 22 being inputted into a decoder 23. By decoding the output of the counter 22, the decoder 23 generates a vertical scan drive timing $DT_V$ which is delayed from the vertical synchronizing signal VS by a period integer times the horizontal scan period. The output timing of the image signal $Y_{1(t)}$ will be set to be delayed from tile vertical scan output timing of the image signal $X_{1(t)}$ by a predetermined period.

On the other hand, selection pulse generating circuits 24 and 25 are provided to generate selection pulses $ST_H$ and $ST_V$ when the circuits 24 and 25 receive the horizontal and vertical scan drive timings $DT_H$ and $DT_V$, respectively. The selection pulse generating circuits 24 and 25 control the signal synthesizing circuit 12 so as to select and output the image signal $Y_{1(t)}$ in synchronism with its output timing. Since the time at which the signal $Y_{0(t)}$ is outputted from the CCD 15 for the inset scene is previously known, each of the selection pulse generating circuits 24 and 25 raises a selection signal ST when received a driving timing DT and diminishes the selection signal ST on termination of the output of the signal $Y_{0(t)}$. The termination of the output may be determined on receiving a signal indicative of when the counts of the counters 21 and 23 reach preselected values. The selection pulse generating circuits 24 and 25 switch the signal synthesizing circuit 12 from a state under which it steadily selects the main scene image signal $X_{1(t)}$ to another state under which the signal synthesizing circuit 12 selects the image signal $X_{1(t)}$, at a timing in accordance with the drive timings $DT_H$ and $DT_V$. After passage of a predetermined period, the signal synthesizing circuit 12 is again switched to the state under which it selects the image signal $X_{1(t)}$. An image signal $Z_{(t)}$ is thus provided which is formed by replacing a part of the image signal $X_{(t)}$ with the image signal $Y_{1(t)}$.

Figure 3:
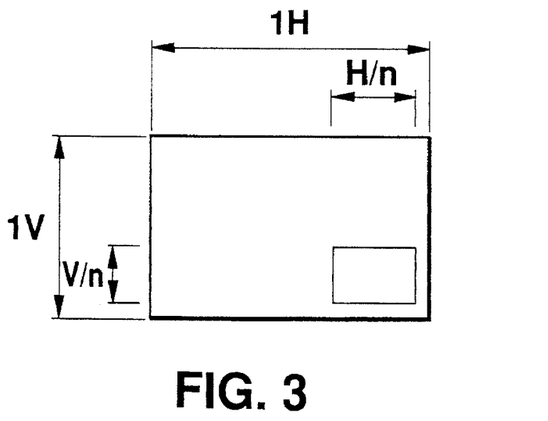
FIG. 3 is a diagrammatic view of a scene displayed.

If the size of the inset scene is a factor of n on that of the main scene as shown in FIG. 3, the amount of information in the image signal $Y_{1(t)}$ becomes a factor of n on that of the image signal $X_{(t)}$. Thus, the CCD 15 has the number of pixels which corresponds to a factor of n on that of the main scene. However, the image signal $Y_{1(t)}$ for the inset scene may be obtained by thinning image signals at any suitable intervals on the signal processing step. The image signal $Y_{1(t)}$ will have the information of image during periods H/n and V/n, in opposition to the image signal $X_{1(t)}$ which has the information of image during the respective one of the horizontal and vertical scan periods (1H and 1V), as shown in FIGS. 4A and 4B. Thus, the selection pulses $ST_H$ and $ST_V$ are set in synchronism with the effective period of the image signal $Y_{1(t)}$. The position of the inset scene in which it is to be displayed on the screen is determined depending on the timing of the raise of the image signal $Y_{1(t)}$, that is, a period of time by which the drive timings $DT_H$ and $DT_V$ are respectively delayed from the horizontal and vertical synchronizing signals $HS_1$ and VS. Thus, the position of the inset scene to be displayed is variable depending on the decoded values from the decoders 21 and 23. For example, when tile counters 20 and 22 are in up-count state, the inset scene will be moved rightwardly on the screen if the decoded value in the decoder 21 is increased and downwardly if the decoded value in the decoder 28 is increased.

Although the present embodiment has been described as to the drive timings $DT_H$ and $DT_V$ provided by the respective counters, they may be obtained similarly by using any other suitable delay circuit such as shift register or the like which can delay the horizontal and vertical synchronizing signals $HS_1$ and VS.

Second Embodiment

The second embodiment of the present invention will now be described with reference to the drawings.

Figure 5:
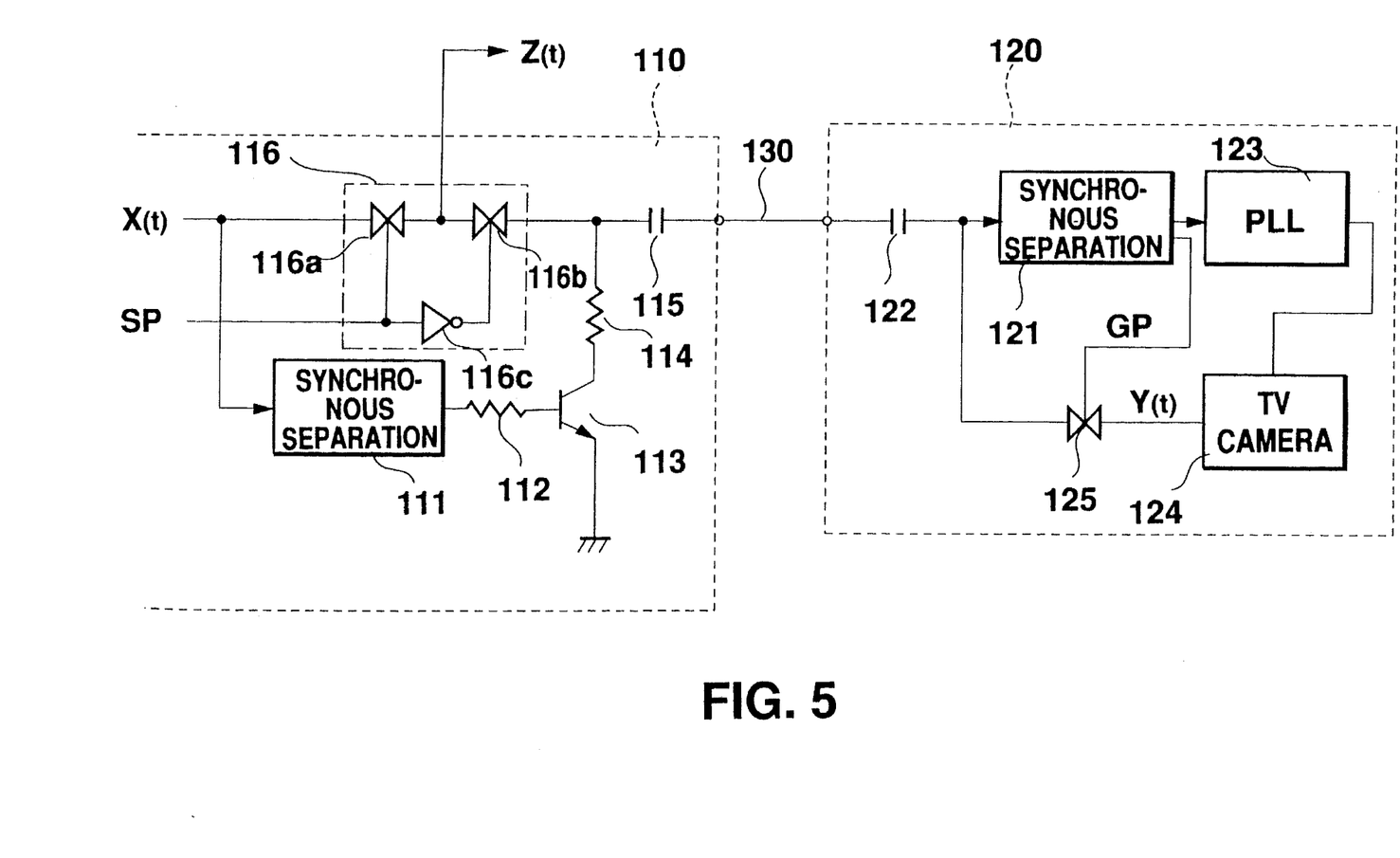
FIG. 5 is a circuit diagram of an image signal processing circuit constructed in accordance with the present invention.
Figure 6A:
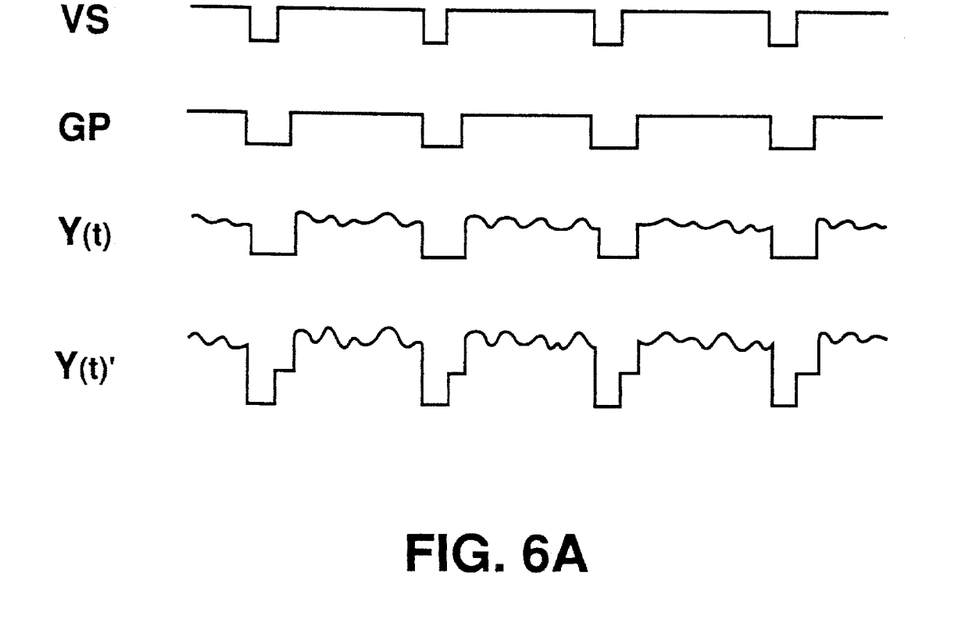
FIGS. 6A and 6B are a view illustrating the operation of the circuit shown in FIG. 5.
Figure 6B:
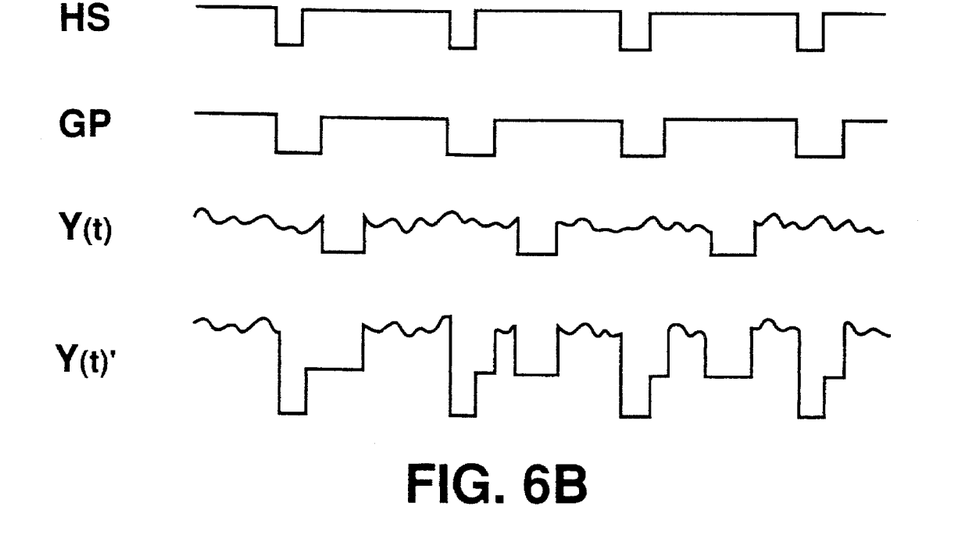

FIG. 5 is a circuit diagram of an image signal processing circuit constructed in accordance with the present invention while FIG. 6 is waveforms illustrating the operation of the image signal processing circuit.

A first image signal $X_{(t)}$ is provided, for example, by an image pickup device such as TV camera or the like. The first image signal $X_{(t)}$ comprises a synchronizing signal component and an image signal component. The first image signal $X_{(t)}$ may be a signal reproduced from a recording medium or a signal received from a television broadcast.

A synchronous separation circuit 111 is provided to separate a synchronizing signal component from the image signal $X_{(t)}$ and to form a composite signal including vertical and horizontal synchronizing components. Such a composite signal is connected to the base of a transistor 113 through a resistor 112 and then fed from the collector of tile transistor 113 to a communication line 130 through resistor 114 and capacitor 115. When passed through the capacitor 115, the DC component of the composite signal is removed therefrom.

On the other hand, another image signal is inputted into the system from the communication line 130 and further supplied to a synthesizing circuit 116 together with the first image signal $X_{(t)}$ whereat these image signals are selectively synthesized into a third image signal $Z_{(t)}$ in response to a selection pulse SP. The synthesizing circuit 116 comprises two gates 116a and 116b which are opened at "H", and an inverter 116c for inverting the selection pulse SP. If the selection pulse SP is "H", the gate 116a is opened. If the selection pulse SP is "L", the gate 116b is opened. Therefore, the synthesizing circuit 116 is controlled at a predetermined timing at which the scenes are synthesized. In such a manner, an image signal processing circuit 110 for synthesizing a plurality of image signals together is defined by the synchronous separation circuit 111, the synthesizing circuit 116 and the transistor 113.

An image pickup device 120 is connected with the image signal processing circuit 110 through the communication line 130 and includes a TV camera 124 which is externally actuated to provide an image signal $Y_{1(t)}$ in synchronism with the synchronizing signal of tile communication line 130. The TV camera 124 receives various types of timing pulses in synchronism with the synchronizing signal on the communication line 130. The scan timing of the image pickup element in the TV camera 124 is synchronized with the synchronizing signal to from the image signal $Y_{1(t)}$ synchronized with the synchronizing signal. More particularly, the synchronous separation circuit 121 detects the synchronizing signal on the communication line 130 and supplies it to a PLL circuit 123 which in turn forms a timing pulse based on tile synchronizing signal. Such a timing pulse is then inputted into the TV camera 124. After outputted from the TV camera 124, the image signal $Y_{(t)}$ includes no synchronizing signal component and fed to the communication line 130 through a capacitor 122. Since the image signal $Y_{(t)}$ is in synchronization with the synchronizing signal on the communication line 130, it will be time-division multiplexed over the synchronizing signal on the communication line 130.

When the image pickup device 120 is started or if the TV camera does not synchronize with the synchronizing signal For any reason, the image signal $Y_{(t)}$ may not be distinguished from the synchronizing signal when they are superimposed over each other on the communication line 130, resulting in the PLL circuit 123 inoperative. To avoid such a problem, a gate circuit 125 is provided which suspends the output of the TV camera 124 when the synchronizing signal does not synchronize the operation of the TV camera 124. The gate circuit 125 receives gate pulses GP synchronizing with the vertical and horizontal synchronizing signals from the synchronous separation circuit 121. As shown in FIGS. 6A and 6B, the occurrence of the image signal $Y_{(t)}$ is prevented at the raising timings of the vertical and horizontal synchronizing signals VS and HS. This will prevent the synchronizing signal component from being mixed with the image signal component when the image signal $Y_{(t)}$ is superimposed over the synchronizing signal.

If tile image pickup device 120 is connected to the image signal processing circuit 110 as shown in FIG. 5, the latter can receive the image signal $Y_{(t)}$ synchronizing with the image signal $X_{(t)}$ through a single communication line 130. These image signals are then synthesized by the synthesizing circuit 116 to form a new image signal $Z_{(t)}$ which can be used to display a reproduced scene corresponding to the image signal $X_{(t)}$ and another reproduced scene corresponding to the image signal $Y_{(t)}$ on the same screen. This means that the communication line for transmitting the image signals can be simplified in construction.

Figure 7:
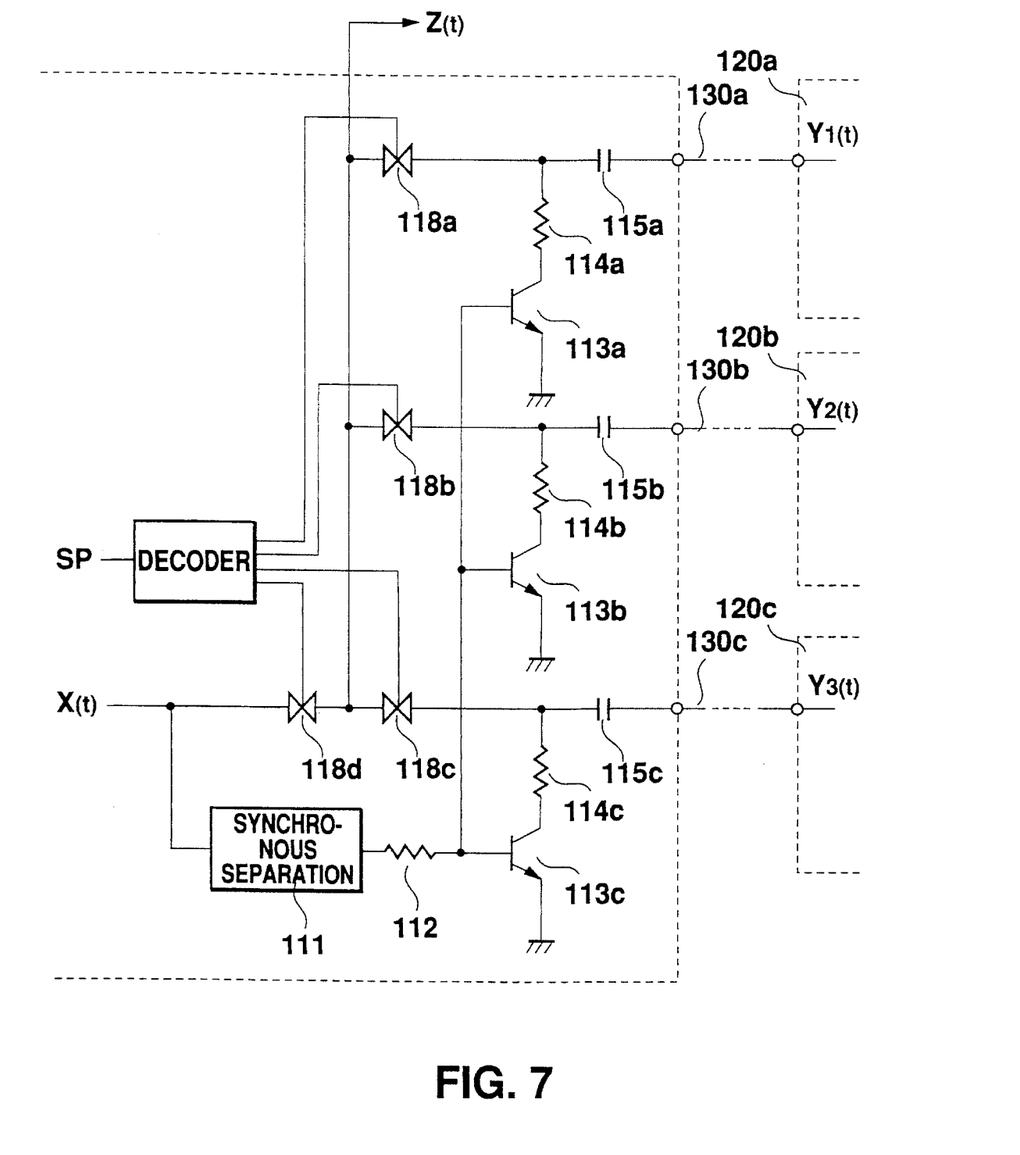
FIG. 7 is a circuit diagram of another image signal processing circuit including a plurality of image pickup units connected therewith.

FIG. 7 shows tile circuit diagram of an image signal processing circuit 110' which is connected with three image pickup devices 120a, 120b and 120c. These image pickup devices 120a, 120b and 120c have the same structure as that of the image pickup device shown in FIG. 1 and will not be illustrated and described in detail.

The image signal processing circuit 110' includes transistors 113a, 113b and 113c which correspond to the respective image pickup devices 120a, 120b and 120c. Each transistor has a base receiving a synchronizing signal from a synchronous separation circuit 111 through a resistor 112. The collector of each transistor 113a, 113b or 113c is connected with a communication line 130a, 130b or 130c through a resistor 114a, 114b or 114c and a capacitor 115a, 115b or 115c. An image signal $Y_{1(t)}$, $Y_{2(t)}$ or $Y_{3(t)}$ from each image pickup device 120a, 120b or 120c is provided to a switch 118a, 118b or 118c through the communication line 130a, 130b or 130c via the capacitor 115a, 115b or 115c. Each switch 118a, 118b or 118c is adapted to switch pulses from a decoder 117 actuated by a selection pulse SP and connected with a common output line which is also connected with a switch 118d for receiving the image signal $X_{(t)}$. These switches 118a, 118b, 118c and 118d define a synthesizing circuit together with the decoder 117. Dependent on the timing switched by the selection pulse SP, the image signals $Y_{1(t)}$, $Y_{2(t)}$ and $Y_{3(t)}$ are selectively synthesized with the image signal $X_{(t)}$ to form an image signal $Z_{(t)}$.

Although the present embodiment has been described as to the image signal processing circuit connected with one or three image pickup devices, it may be connected with more than three image pickup devices. In such a case, each image pickup device will be connected with the image signal processing circuit through a signal communication line. This simplifies the communication network.

We claim:

1. An image pickup apparatus for synthesizing first and second image signals in which said first image signal is derived from an external source and forms a main image having a predetermined number of pixels, comprising:

a solid state image pickup device including a plurality of pixels arranged into a matrix, wherein a number of rows of said plurality of pixels is 1/n times the predetermined number of rows of pixels on said main image, n being greater than 1, said image pickup device being adapted to generate charges of information corresponding to a received image pattern;

a drive circuit for driving said solid state image pickup device to provide the second image signal, said drive circuit causing said solid state image pickup device to vertically and horizontally transfer the charges of information therefrom;

a detecting circuit for detecting the horizontal and vertical synchronizing signals in said first image signal;

a timing control circuit for determining a timing at which said drive circuit is to be driven, based on the horizontal and vertical synchronizing signals from said detecting circuit; and a synthesizing circuit for selecting said first and second image signals to synthesize them in synchronism with the actuation of said drive circuit;

wherein the first image signal is for a main scene and the second image signal is for an inset scene, the position of an inset scene in a main scene is determined by driving timing of said solid state image pickup device, said driving timing being determined by said timing control circuit, and the number of pixels of the pickup device for the inset image is $1/n^2$ times the number of pixels of the pickup device for the main image, and the solid state image pickup device has a reduced number of pixels because said second image signal is for said inset scene, and wherein said solid state image pickup device outputs the charges for all the pixels within a part of the horizontal and vertical scanning periods.

2. An image pickup apparatus as defined in claim 1 wherein said first image signal includes an image signal component and horizontal and vertical synchronizing signals which are superimposed over said image signal component and wherein said detection circuit is adapted to separate said horizontal and vertical synchronizing signals from said first image signal.

3. An image pickup apparatus as defined in claim 1 wherein said timing control circuit forms a drive timing signal for said drive circuit and a switching timing signal for said synthesizing circuit.

4. An image pickup apparatus as defined in claim 3 wherein said timing control circuit includes a first counter reset by tile horizontal synchronizing signal and operative to count a given number of clocks, a first decoder for decoding the output or said first counter, a second counter reset by the vertical synchronizing signal and operative to count another given number of clocks and a second decoder for decoding the output of said second counter.

5. An image pickup apparatus for providing a second image signal to be synthesized with a first image signal in which said first image signal is derived from an external source and forms a main image, wherein the second image signal is derived from a solid state image pickup device and obtains the image information, the solid state image pickup device including a plurality of pixels arranged into a matrix, wherein a number of rows of said plurality of pixels is 1/n times the predetermined number of rows of pixels on said main image, n being greater than 1, comprising:

a communication line;

a synchronizing separating circuit connected to said communication line and for separating a synchronizing signal supplied externally through said communication line; and a TV camera actuated by the synchronizing signal from said synchronous separation circuit and operative to provide the second image signal in synchronization with said synchronizing signal and to output said second image signal into said communication line;

wherein the first image signal is for a main scene and the second image signal is for an inset scene, the position of an inset scene in a main scene is determined by driving timing of said solid state image pickup device, said driving timing being determined by said timing control circuit, the number of pixels of the pickup device for the inset image is $1/n^2$ times the number of pixels of the pickup device for the main image, and the solid state image pickup device has a reduced number of pixels because said second image signal is for said inset scene, and wherein said solid state image pickup device outputs the charges for all the pixels within a part of the horizontal and vertical scanning periods.

6. An image pickup apparatus as defined in claim 5 wherein said TV camera outputs an image signal including no synthesizing signal.

7. An image pickup apparatus as defined in claim 6, further comprising a phase locked loop for receiving said synchronizing signal and for outputting another synchronizing signal corresponding to said synchronizing signal and wherein said TV camera is actuated by the synchronizing signal from said phase locked loop.

8. An image pickup apparatus as defined in claim 5, further comprising gate means disposed in the output path of said TV camera connected with said communication line to provide the image signal thereto, said gate means adapted to block the image signal from said TV camera.

9. An image signal synthesizing system for synthesizing first and second image signals in which said first image signal is derived from an external source and forms a main image, wherein the second image signal is derived from a solid state image pickup device which includes a plurality of pixels arranged into a matrix, wherein a number of rows of said plurality of pixels is 1/n times the predetermined number of rows of pixels on said main image, n being greater than 1, comprising:

a first block including a synchronizing separation circuit for separating a synchronizing signal from said first image signal, a communication line for transmitting an image signal from an external unit, delivery means for delivering the synchronizing signal from said synchronizing separation circuit to said communication line and a synthesizing circuit for receiving the image signal transmitted from said communication line and said second image signal and for selecting and synthesizing said image signals at a timing determined by said synchronizing signal; and a second block including a synchronizing separating circuit connected with said communication line and for separating said synchronizing signal from said communication line and a TV camera actuated in synchronization with this synchronizing signal to cause said solid state image pickup device to horizontally transfer the charge of information;

wherein the first image signal is for a main scene and the second image signal is for an inset scene, the position of an inset scene in a main scene is determined by driving timing of said solid state image pickup device, said driving timing being determined by said timing control circuit, the number of pixels of the pickup device for the inset image is $1/n^2$ times the number of pixels of the pickup device for the main image, and the solid state image pickup device has a reduced number of pixels because said second image signal is for said inset scene, and wherein said solid state image pickup device outputs the charges for all the pixels within a part of the horizontal and vertical scanning periods.

10. An image signal synthesizing system as defined in claim 9 wherein a plurality of said second blocks are connected with said first block through the same communication line.

* * * * *